United States Patent [19]

Burdick

[11] 3,829,116
[45] Aug. 13, 1974

[54] RETRACTABLE GUIDE MECHANISM
[75] Inventor: Robert E. Burdick, Santa Barbara, Calif.
[73] Assignee: Rolair Systems, Inc., Santa Barbara, Calif.
[22] Filed: Oct. 24, 1972
[21] Appl. No.: 300,186

[52] U.S. Cl............................ 280/43.23, 180/119
[51] Int. Cl.......................... B60v 1/00, B62d 61/12
[58] Field of Search........... 280/43.23, 43.18, 43.19, 280/43.14, 43.13, 43.11, 124 A, 124 F; 254/93 HP; 180/119

[56] References Cited
UNITED STATES PATENTS
2,501,750   3/1950   Warner........................... 280/43.19
3,325,181   6/1967   Granning........................ 280/43.23
3,592,285   7/1971   Noble.................................. 180/119
3,669,292   6/1972   Tuura........................... 254/93 HP X Primary Examiner—David Schonberg
Assistant Examiner—Randall A. Schrecengost
Attorney, Agent, or Firm—Harris, Kern, Wallen & Tinsley

[57] ABSTRACT

A retractable guide wheel mechanism for an air cushion transporter and suitable for mounting within or at the edge of the transporter platform. A housing with pivoted frame carrying the guide wheel, with a spring for urging the wheel upward and an air unit for urging the wheel downward into engagement with the ground surface.

2 Claims, 4 Drawing Figures

PATENTED AUG 13 1974  3,829,116
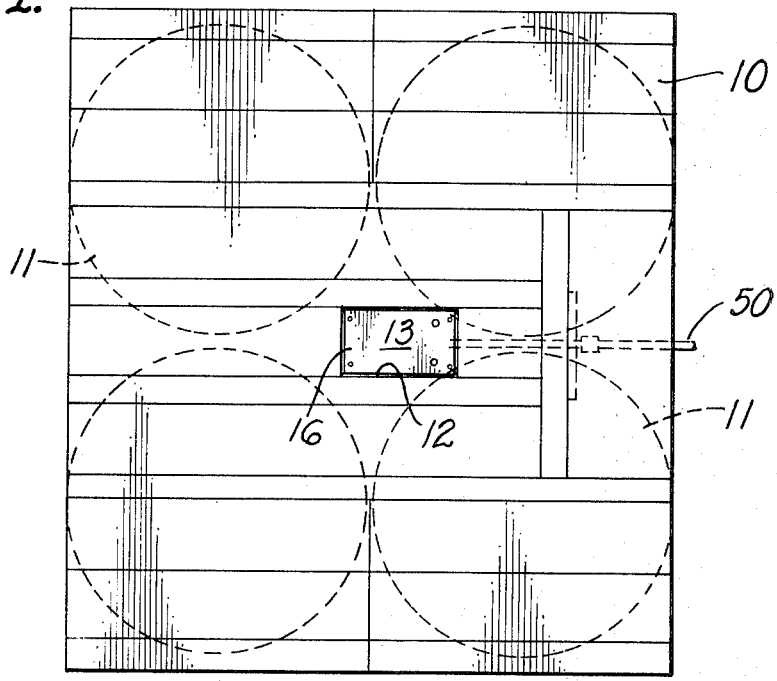
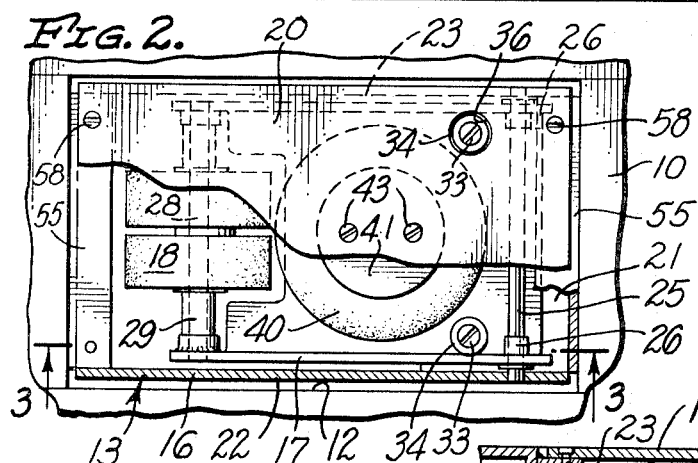
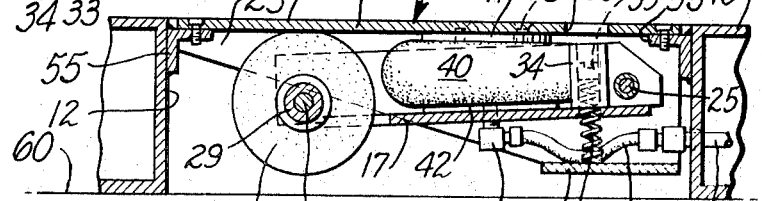
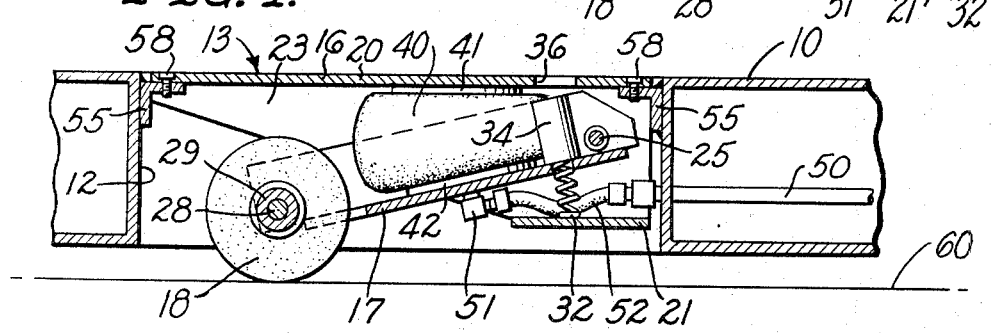

RETRACTABLE GUIDE MECHANISM

This invention relates to guiding mechanism and more particularly, to a guide mechanism with a retractable guide wheel suitable for use with the platform of an air cushion transporter.

An air cushion transporter includes a platform for carrying the load and a plurality of air bearings for supporting the platform above the ground surface on a thin film of air providing very low friction so that heavy loads are easily moved along the ground surface. A typical transporter is shown in the copending U.S. Pat. application of Robert E. Burdick, Ser. No. 180,666 filed Sept. 15, 1971, now U.S. Pat. No. 3,756,342, entitled REPLACEMENT AIR CUSHION DEVICE, and assigned to the same assignee as the present application.

When the air supply is turned on to a transporter, the transporter has low friction in all directions with a tendency to drift laterally as a result of wind loading and sloping floors. Lateral stability may be achieved by a guide wheel carried on the platform and engageable with the ground surface. A guide wheel should be cushioned to maintain ground contact over irregular surfaces and should be loaded in some way to maintain a relatively high force engagement with the ground. Also, the guide wheel should be retractable in order to achieve lateral movement when desired and also to permit deflation of the air bearings without damage to the guide mechanism. The guide wheel also aids in turning, inasmuch as inertia tends to cause the load to continue in a straight line —the guide wheel counteracts this inertia directing the load in the direction of wheel rotation.

The present invention is directed to a very simple, trouble free and low profile guide wheel mechanism which can be mounted within a very thin transporter platform. A typical guide wheel mechanism of the invention has an overall height of 4 inches and fits into a transporter platform 4½ inches thick. The stroke of the retraction system is 1½ inches to provide wheel engagement with the ground surface and a downward force of 600 pounds is obtained at the wheel. Prior art devices have utilized complex air cylinder and piston arrangements with bell cranks and linkages to obtain the low profile. The present invention utilizes a simple pivoted frame with a spring for upward movement and an air balloon unit for downward movement. Other advantages, features and results of the invention will more fully appear in the course of the following description. The drawing merely shows an inscription merely describes a preferred embodiment of the present invention which is used by the way of illustration or example.

In the drawing:

FIG. 1 is a top view of an air cushion transporter with a retractable guide mechanism incorporating the presently preferred embodiment of the invention;

FIG. 2 is an enlarged view of a portion of the transporter of FIG. 1, partly in section;

FIG. 3 is a sectional view taken along the line 3—3 of FIG. 2, showing the wheel retracted; and FIG. 4 is a view similar to that of FIG. 3 showing the wheel in the extended position.

The transporter of FIG. 1 includes a platform 10 with four air bearings 11 carried on the lower surface of the platform. Typically the platform 10 is made of rectangular steel tubes welded in side by side arrangement, with a space 12 for receiving the retractable wheel guide 13.

The preferred embodiment of the retractable guide wheel mechanism includes a housing 16, a frame 17 and a wheel 18. The housing 16 may be cut from a length of rectangular steel tubing or may be fabricated from a plurality of pieces, as desired. The result of housing has a top plate 20, a bottom plate 21 and side plates 22, 23.

The frame 17 typically is a length of upwardly opening channel mounted at one end to the housing 16 on a shaft 25 with bushings 26, for pivoting of the frame relative to the housing. One or more wheels 18 are mounted in the other end of the frame 17 on a shaft 28, with spacers 29.

Two spring units are mounted between the housing and frame for urging the frame and wheel to the upward position of FIG. 3. In the embodiment illustrated, each spring unit includes a coil spring 32 with one end resting on the lower plate 21 of the housing and with the other end engaging a threaded plug 33 in a tube 34 carried on the frame 17. A clearance opening 36 is provided in the upper plate 20 for adjusting the position of the plug 33 to adjust the spring force.

An air balloon unit is carried between the frame and housing for urging the wheel downward to the position of FIG. 4 when air under pressure is provided to the unit. A typical air balloon unit has a diaphragm 40, an upper mounting plate 41 and a lower mounting plate 42. Such air balloon units are commercially available and sometimes are referred to as airmounts. The upper mounting plate 41 is attached to the upper plate 20 of the housing by screws 43, with the lower mounting plate 42 resting on the frame 17. An air line 50 is connected to the air unit inlet 51 by a flexible line 52 and a (control valve not shown) may be used to connect air under pressure to the unit 40.

The lower plate 21 of the housing is relatively short, with the wheel 18 and a portion of the frame 17 projecting over the plate 21. The upper plate 16 is relatively large, projecting over the wheel and frame for engaging and resting on support brackets 55 which project into the space 12. The guide mechanism 13 may be lowered into position in the space 12 of the platform and fixed in place by screws 58, after which the air line connection is completed.

In normal operation, air under pressure will be supplied to the line 50 at the same time it is supplied to the air bearings 11. As the air bearings are inflated and the transporter floats on air film, the air unit 40 will be pressurized and will move the wheel downward into engagement with the ground surface 60, as seen in FIG. 4. Since the axle or shaft for the wheel 18 is fixed, the transporter will be readily moved in the fore and aft direction but the guide wheel will resist movement laterally. If it is desired to move the transporter laterally on the air bearings the air pressure to the line 50 is shut off and the springs 32 will move the wheel to the retractive position of FIG. 3.

In one embodiment, the overall height of the retractable mechanism is 4 inches, readily fitting into a 4½ inches high platform space. This particular unit provides a 1½ inches vertical stroke and a 600 pound force at the wheel. Another unit is manufactured with a 3 inches overall height for installation in a 3½ inches high platform space. Yet another unit has a 6¼ inches overall height for installation in a 6¾ inches high platform space.

I claim:

1. Guide wheel mechanism for an air cushion transporter, comprising in combination:

a housing including an upper plate and a lower plate;

a wheel;

a frame mounted at one end in said housing between said upper and lower plates for pivoting toward and away from said upper plate, with said wheel mounted at the opposite end of said frame for rotation about an axis parallel to the frame pivot axis;

spring means carried between said frame and housing for urging said frame upward;

an air balloon unit carried between said frame and housing for urging said frame downward when inflated;

means for introducing air under pressure into said air balloon unit;

with said spring means mounted between said frame and housing lower plate, and with said air balloon unit mounted between said frame and housing upper plate; and a spring tube fixed in said frame and a plug threadedly mounted in said tube, with said spring means including a coil spring in said tube between said plug and lower plate.

2. A mechanism as defined in claim 1 with said wheel and a portion of said frame extending over said lower plate, and with said upper plate extending over said frame and wheel for positioning on transporter platform wheel well brackets.

* * * * *